(12) United States Patent
Desell et al.

(10) Patent No.: US 10,466,266 B2
(45) Date of Patent: Nov. 5, 2019

(54) FLIGHT PARAMETER PREDICTION USING NEURAL NETWORKS

(71) Applicant: University of North Dakota, Grand Forks, ND (US)

(72) Inventors: Travis Desell, Grand Forks, ND (US); Jim Higgins, Grand Forks, ND (US); Sophine Clachar, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 208 days.

(21) Appl. No.: 15/503,982

(22) PCT Filed: Aug. 14, 2015

(86) PCT No.: PCT/US2015/045363
§ 371 (c)(1),
(2) Date: Feb. 14, 2017

(87) PCT Pub. No.: WO2016/025887
PCT Pub. Date: Feb. 18, 2016

(65) Prior Publication Data
US 2018/0348250 A1 Dec. 6, 2018

Related U.S. Application Data

(60) Provisional application No. 62/037,408, filed on Aug. 14, 2014.

(51) Int. Cl.
*G01P 13/02* (2006.01)
*G01C 23/00* (2006.01)
(Continued)

(52) U.S. Cl.
CPC ............ *G01P 13/025* (2013.01); *B64D 45/00* (2013.01); *G01C 5/005* (2013.01); *G01C 23/00* (2013.01);
(Continued)

(58) Field of Classification Search
None
See application file for complete search history.

(56) References Cited

U.S. PATENT DOCUMENTS 5,751,609 A    5/1998  Schaefer, Jr. et al.
6,332,105 B1 * 12/2001  Calise .................. G05B 13/027
                                                      244/195
(Continued)

FOREIGN PATENT DOCUMENTS

EP          1382012 B1 *  1/2007  ............... G06N 3/08
WO    WO2003081527 A1 * 10/2003  ............. G06N 3/086
WO    WO-2016025887 A2    2/2016

OTHER PUBLICATIONS

"International Application Serial No. PCT/US2015/045363, International Search Report dated May 31, 2016", 4 pgs.
(Continued)

*Primary Examiner* — Thomas G Black
*Assistant Examiner* — Demetra R Smith-Stewart
(74) *Attorney, Agent, or Firm* — Schwegman Lundberg & Woessner, P.A.

(57) ABSTRACT

A neural network including a set of input nodes may consume a respective stream of time-series data recorded during a flight of a flying aircraft, each stream of time-series data representing measurements of a respective flight parameter captured by a sensor at various time-steps of the flight. A training circuit set may train the neural network to predict a future measurement of the flight parameter. Training the neural network may include comparing a predictive value (Continued)

from the neural network to a measured value of a flight parameter and modifying structural components of the neural network to bring the predictive value closer to the measured value. A parameter acquisition circuit set may acquire time-series data of a flight parameter. A prediction circuit set may apply the time-series data to the trained neural network to predict the next measurement for the flight parameter in the time-series data.

45 Claims, 6 Drawing Sheets

(51) Int. Cl.
 *G01P 5/00* (2006.01)
 *B64D 45/00* (2006.01)
 *G06N 3/08* (2006.01)
 *G01C 5/00* (2006.01)
 *G05B 23/02* (2006.01)

(52) U.S. Cl.
 CPC .............. *G01C 23/005* (2013.01); *G01P 5/00* (2013.01); *G05B 23/024* (2013.01); *G06N 3/086* (2013.01); *B64D 2045/0065* (2013.01)

(56) References Cited

U.S. PATENT DOCUMENTS

| | | | | |
|---|---|---|---|---|
| 6,466,888 | B1* | 10/2002 | McCool | G05D 1/0825 |
| | | | | 702/144 |
| 2004/0050999 | A1* | 3/2004 | Hill | G05D 19/02 |
| | | | | 244/17.27 |
| 2008/0144944 | A1* | 6/2008 | Breed | G06K 9/00369 |
| | | | | 382/224 |
| 2011/0125346 | A1 | 5/2011 | Ben-Arie et al. | |
| 2013/0282635 | A1 | 10/2013 | Düll et al. | |

OTHER PUBLICATIONS

"International Application Serial No. PCT/US2015/045363, Written Opinion dated May 31, 2016", 5 pgs.
"International Application Serial No. PCT/US2015/045363, International Preliminary Report on Patentability dated Feb. 23, 2017", 7 pgs.

\* cited by examiner

FLIGHT PARAMETER PREDICTION USING NEURAL NETWORKS

CLAIM OF PRIORITY

This application is a U.S. National Stage Filing under 35 U.S.C. 371 from International Application No. PCT/US2015/045363, filed Aug. 14, 2015, which application claims the benefit of priority to U.S. Provisional Patent Application Ser. No. 62/037,408, filed on Aug. 14, 2014 and entitled, "FLIGHT PARAMETER PREDICTION USING NEURAL NETWORKS," which applications are each hereby incorporated by reference herein in its their entirety.

BACKGROUND

General aviation comprises approximately 63% of all civil aviation activity in the United States, encompassing operation of all non-scheduled and non-military aircraft. Although general aviation is a valuable and lucrative industry, it has the highest accident rates within civil aviation. For many years, the general aviation accident and fatality rates have hovered around 7 and 1.3 per 100,000 flight hours, respectively. The general aviation community and its aircraft are very diverse, limiting the utility of traditional flight data monitoring (FDM) approaches used by commercial airlines for predicting problems and failures.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

The National General Aviation Flight Information Database (NGAFID) was developed at the University of North Dakota as a central repository for general aviation flight data. It consists of per-second flight data recorder (FDR) data from three fleets of aircraft. As of January 2014, the database stored FDR readings from over 208,000 flights. It currently stores almost 400 million per-second records of flight data. The NGAFID provides an invaluable source of information about general aviation flights, as most of these flights were piloted by aviation students, resulting in a wider variance in flight parameters than what may normally be expected from professionally piloted flights.

Embodiments described herein predict future values of flight parameters based on acquired time-series data to predict future flight anomalies, which in turn can be used to generate a warning and/or an alert that an anomalous situation is about to occur. Such "early-warnings" can be used by pilots, aircraft technicians, aircraft maintenance staff, etc, to help avoid or mitigate an unsafe flight situation.

Figure 1:
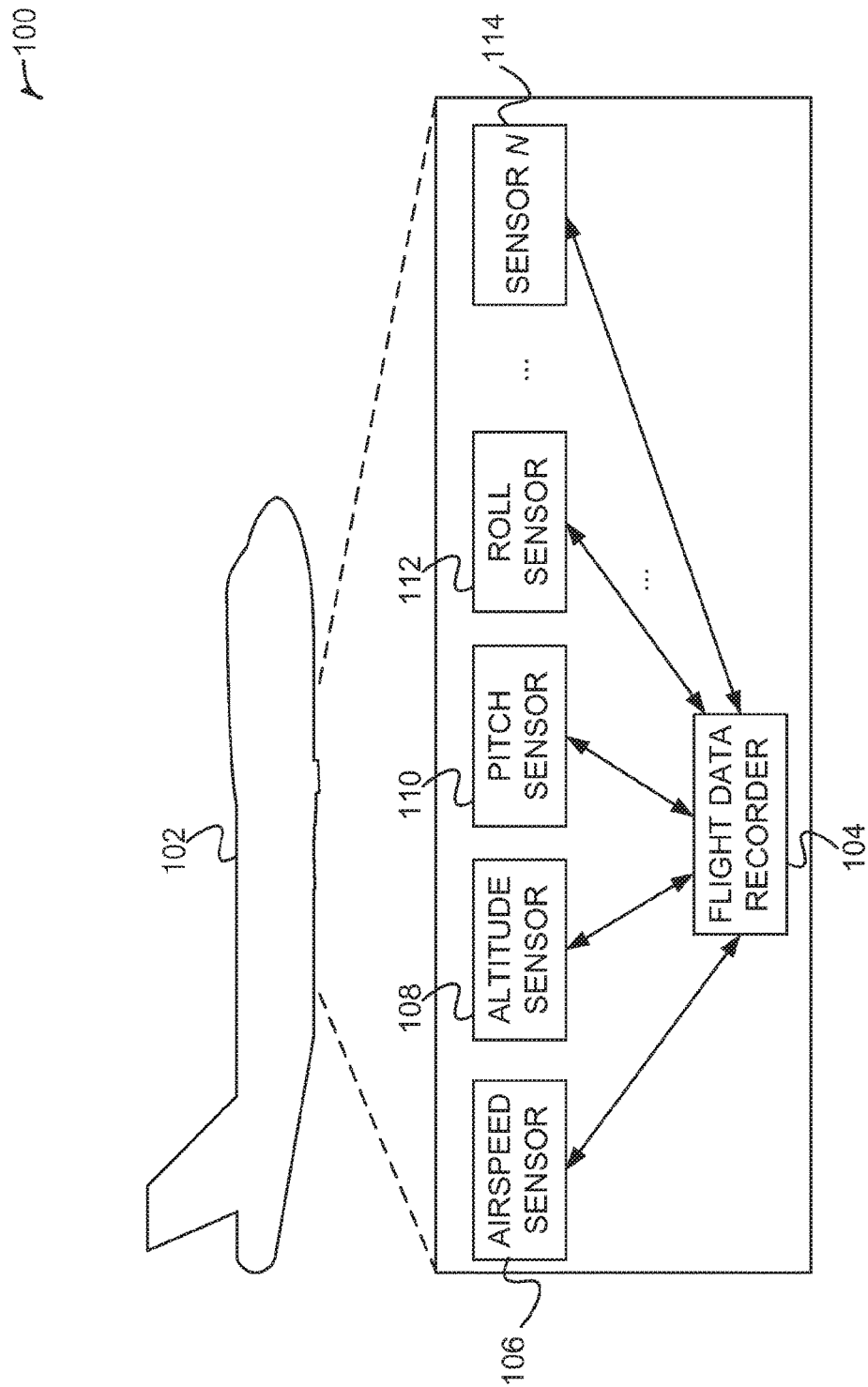
FIG. 1 illustrates an operational environment of an aircraft, in accordance with some embodiments.

FIG. 1 illustrates an operational environment 100 of an aircraft 102, in accordance with some embodiments. In some embodiments, aircraft 102 may be a fixed-wing airplane, a helicopter e.g., rotorcraft), a balloon, a dirigible, a glider, etc.

Aircraft 102 includes one or more flight data recorders 104. In some embodiments with multiple flight data recorders 104, the multiple flight data recorders 104 are used for redundancy purposes. In some embodiments with multiple flight data recorders 104, respective flight data recorders are used to capture sensor data from respective sensors. For example, an aircraft 102 may have two flight data recorders 104, with one set of the aircraft's 102 sensors assigned to one flight data recorder 104 and the rest of the aircraft's 102 sensors assigned to the other flight data recorder 104. In some embodiments, multiple flight data recorders 104 may be used for redundancy and for capturing respective sensor data from respective sensors.

Aircraft 102 may include one or more sensors of various types. In some embodiments, aircraft 102 may include one or more airspeed sensors 106, one or more altitude sensors 108 (e.g., altimeters), one or more pitch sensors 110, or one or more roll sensors 112. In some embodiments, aircraft 102 may have additional sensors 114 of various types.

In some embodiments, a sensor 106-114 may collect data for a single parameter. For example, an airspeed sensor 106 might only collect airspeed data. In some embodiments, a sensor 106-114 may collect data for more than one parameter. For example, single sensor may collect data for both pitch and roll.

In some embodiments, the various sensors 106-114 may collect data at various time-steps intervals) during the flight. For example, the sensors 106-114 may collect data once every second, once every other second, once every ten seconds, etc. In some embodiments, the various sensors 106-114 may collect data at different time-steps from one or more different sensors 106-114. The sensors 106-114 provide the collected data to the flight data recorder(s) 104, which record the collected sensor data. The sensor data recorded by the flight data recorder(s) 104 is then used to train a neural network to predict future values for the parameter(s).

Figure 2A:
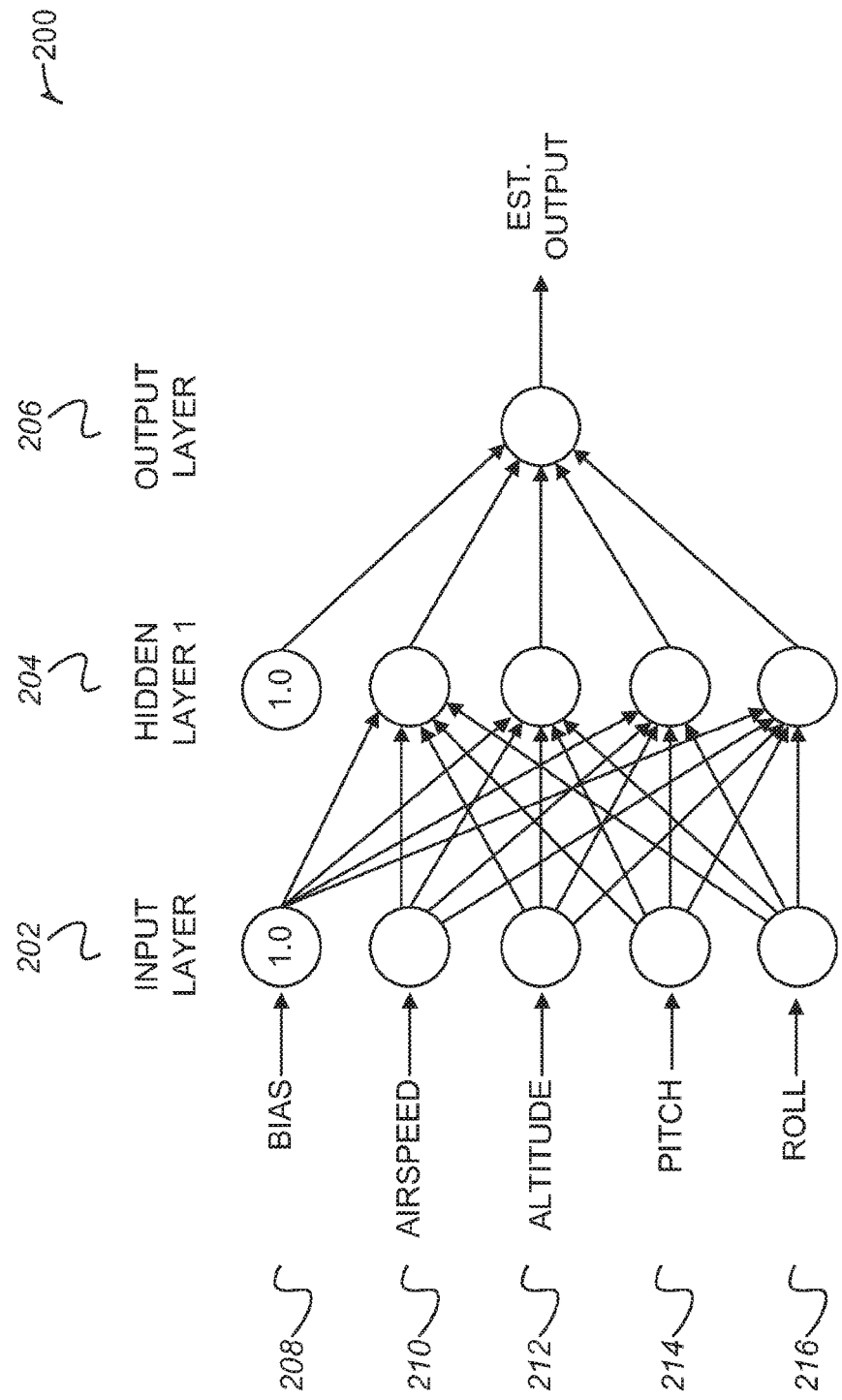
FIG. 2A illustrates a design of a feed forward neural network for predicting future values of flight parameters based on acquired time-series data, in accordance with some embodiments.
Figure 2B:
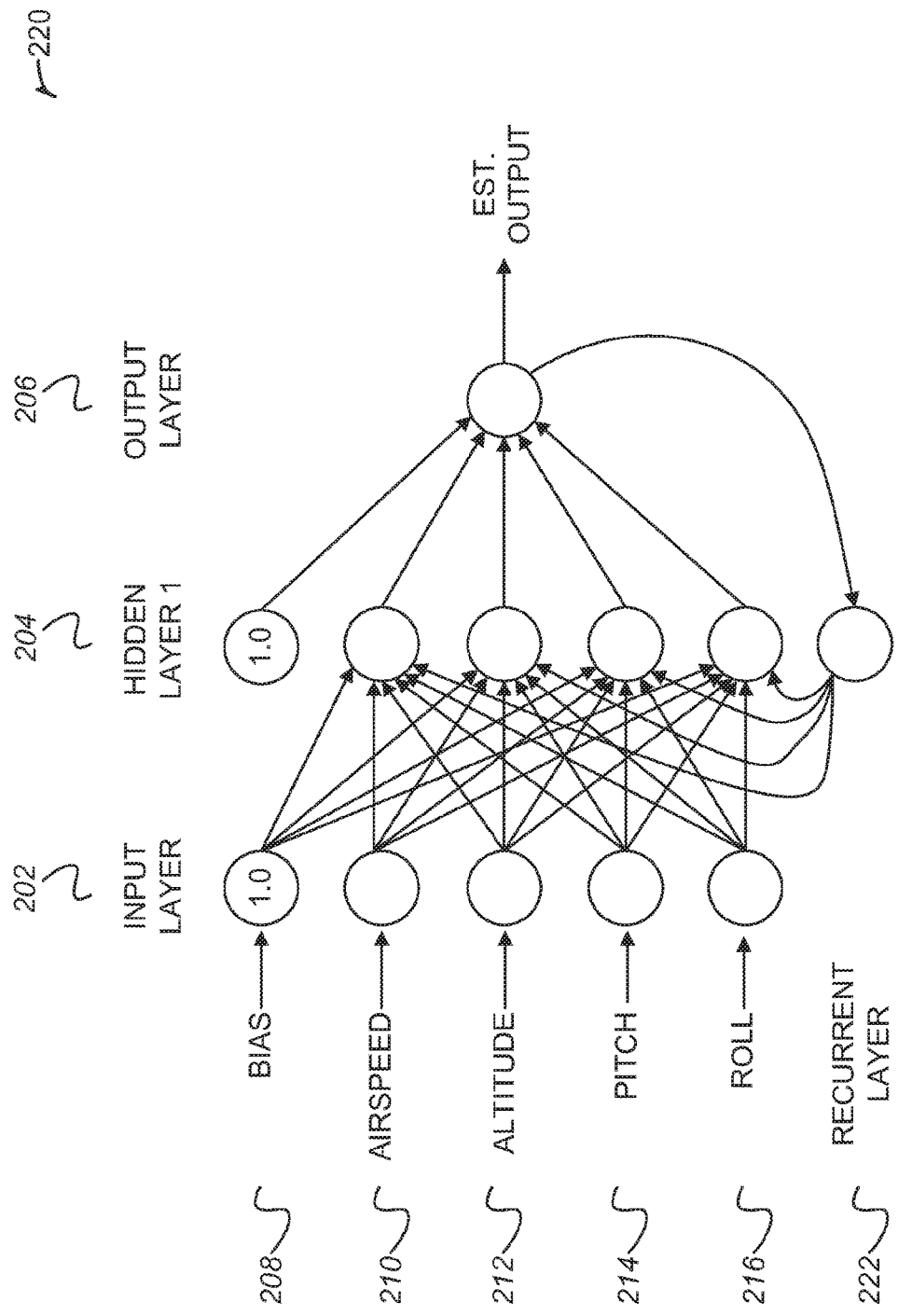
FIG. 2B illustrates a design of a Jordan neural network for predicting future values of flight parameters based on acquired time-series data, in accordance with some embodiments.
Figure 2C:
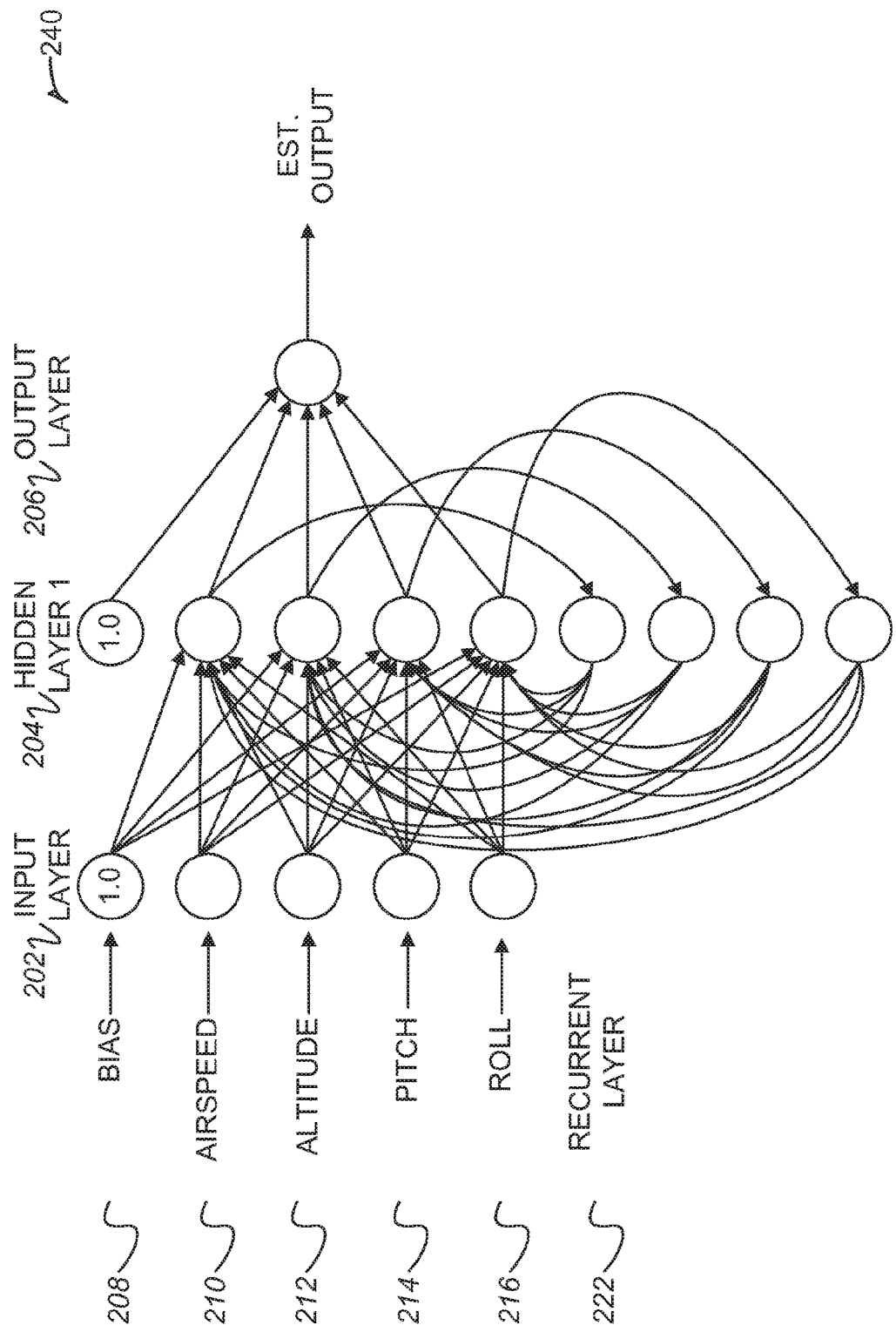
FIG. 2C illustrates a design of an Elman neural network for predicting future values of flight parameters based on acquired time-series data, in accordance with some embodiments.

FIG. 2A illustrates a design of feed forward neural network 200 for predicting future values of flight parameters based on acquired time-series data, in accordance with some embodiments. FIG. 2B illustrates a design of a Jordan neural network 220 for predicting future values of flight parameters based on acquired time-series data, in accordance with some embodiments, and FIG. 2C illustrates a design of an Elman neural network 240 for predicting future values of flight parameters based on acquired time-series data, in accordance with some embodiments. In some embodiments, a neural network has an input layer 202, which includes input parameters and an input bias 208. In some embodiments, the neural network has an output layer 206. In some embodiments, a neural network has at least one optional hidden layer 204. In some embodiments, a neural network has at least one optional recurrent layer 222.

Detecting outliers in data sets containing time-series data can be challenging and very computationally expensive, as each recording can have multiple time-series data sets (e.g., flight data can have upwards of 200 time-series recordings per flight, similar with engine data), and each time-series can have thousands of readings.

Comparing the distance between any two sets of time-series data is computationally challenging; for many clustering algorithms, such as K Nearest Neighbor, DBSCAN, and Self Organizing Maps, comparisons must be done multiple times to obtain meaningful results.

In some embodiments, a neural network is trained to predict time-series data given other input time-series data. In some embodiments, weights can be used as input to clustering algorithms, which calculate the distance between parameter sets, providing a massive improvement in performance versus comparing the distance of the original time-series (each of which can have thousands or more values). In some embodiments, the differences in these weights and their predictive ability on time-series data can be used to detect outliers and anomalies.

In some embodiments, a neural network utilizes residuals, or lags, from linear data as additional inputs to the neural network. In some embodiments, instead of basing prediction on single parameter time-series data, a neural network uses multiple streams of input time-series data (e.g., airspeed 210, altitude 212, pitch 214, and roll 216) to predict future values of each of those parameters, allowing dependencies between the input parameters to be exploited.

In some embodiments, a neural network is used to predict an input parameter. In some embodiments, an input parameter is one of airspeed. 210, altitude 212, pitch 214, and roll 216.

In some embodiments, the neural network may be a feed forward, a Jordan, or an Elman neural network. In some embodiments, the neural network may have zero, one, or more layers of lag variables. In some embodiments, a feed forward or Jordan neural network may have zero, one, or more hidden layers 204. In some embodiments, the neural network is fully connected between layers.

In some embodiments, a lag layer is added as additional input nodes to the neural network. In some embodiments, a lag layer includes one input node for each parameter. For example, in a neural network with four input parameters, adding one lag layer would add four additional input nodes, adding two lag layers would add eight additional nodes, etc.

In some embodiments, the first order lag variables ($\Delta$) are the difference between the current and previous time-step, e.g.:

$$\Delta_t(\text{Airspeed}) = \text{Airspeed}_t - \text{Airspeed}_{t-1}$$

where t is the current time-step and t−1 is the previous time-step.

In some embodiments, the second order lag variables ($\Delta 2$) are the difference between the current and previous first order lag variables, e.g.:

$$\Delta_t^2(\text{Airspeed}) = \Delta_t(\text{Airspeed}) - \Delta_{t-1}(\text{Airspeed})$$

The following naming scheme was used to describe the various neural networks: "network type/l(# of lag layers)/h(# of hidden layers)". In this naming scheme, "ff/1/h1" would describe a feed forward network 200 with one lag layer and one hidden layer 204, while "jordan/l2/h0" would describe a Jordan network 220 with two lag layers (the first order lag fables and the second order lag variables) and no hidden layer 204.

In some embodiments, a neural network is designed to predict the next second of flight data given the previous second of flight data and, if used, the first and second order lag variables. In some embodiments, to determine an optimal weight for a neural network, the following objective function is used for backpropagation and/or differential evolution:

$$f(w) = \frac{\sum_{t=0}^{n-1} |nn(I_t, \Delta_t, \Delta_t^2, w)_{output} - I_{t+1,output}|}{n-1}$$

where f (w) is the objective function evaluated over the weights w, $I_t$ is the input at time-step t, and the absolute difference between the output predicted by the neural network ($nn(I_t, \Delta_t, \Delta_t^2, w)_{output}$) and that value at the next time-step ($I_{t+1,output}$) is calculated over every per second data reading (0 . . . n−1), using the input parameters and, if used, input lags ($I_t, \Delta_t, \Delta_t^2$), if used. Dividing this value by the number of comparisons (n−1) produces the mean absolute error (MAE) for the target output for the flight.

In some embodiments, the flight data is stored as raw data from the flight data recorders. In some embodiments, the flight data must be cleaned before use. When a FDR turns on, some of the sensors are still calibrating or not immediately online, so the first minute of flight data can have missing and erroneous values. In some embodiments, these initial recordings are removed from the data before the data is provided to a neural network for training.

In some embodiments, the parameters have wide ranges and/or different units, e.g., pitch 214 and roll 216 are recorded in degrees, altitude 212 in meters, airspeed 210 in knots, etc, in some embodiments, to remove bias, the parameters are normalized to values between 0 and 1, where 0 is the minimum value recorded and 1 is the maximum value recorded for each parameter.

In some embodiments, the large number of per-second recordings for each flight results in poor weights to a recurrent layer 222 of a recurrent neural network, causing the fitness to grow beyond the bounds of double precision. In some embodiments, to alleviate this problem, recurrent nodes 222 of a recurrent neural network are bounded between −2 and 3, thereby eliminating overflow errors. In some embodiments, the weights for a neural network are hounded between −1.5 and 1.5 to limit the search space of the evolutionary algorithms and initial values for backpropagation.

Various evolutionary algorithms may be used for different distributed computing environments. Generally, the evolutionary algorithms fall into three categories: (1) single population (e.g., panmictic, coarse-grained); (2) multi-population (e.g., island, medium-grained); and (3) cellular (e.g., fine-grained). These various approaches have different effects on the explorative and exploitative properties of the evolutionary algorithms, with smaller subpopulations allowing faster exploitation of their search subspaces.

In some embodiments with large quantities of data, and the potential complexity of examining complex neural networks over per-second flight data, an evolutionary algorithms package that can be used on high-performance computing resources is required. In some embodiments, an evolutionary algorithms package can execute massively distributed evolutionary algorithms on tens of thousands of host computer systems. In some embodiments, an evolutionary algorithms package provides support for computer systems with multiple graphical processing units ("GPUs"). In some embodiments, executing evolutionary algorithms asynchronously provides improvements to performance and scalability over iterative approaches.

Figure 3:
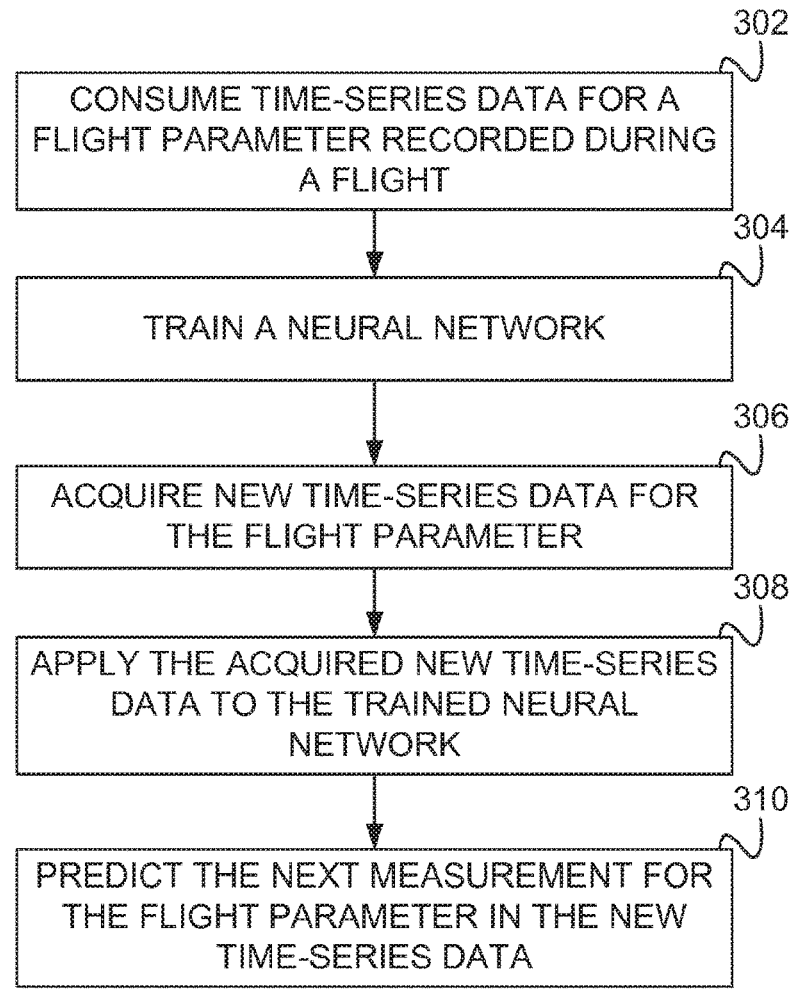
FIG. 3 illustrates a process for using a trained neural network to predict future values of flight parameters based on acquired time-series data, in accordance with some embodiments.

FIG. 3 illustrates a process 300 for using a trained neural network to predict future measurements of flight parameters based on acquired time-series data, in accordance with some embodiments.

At operation 302, time-series data for a parameter is consumed by a neural network. In some embodiments, the neural network includes a set of input nodes arranged to consume a respective stream of time-series data recorded during a flight of a flying aircraft, each stream of time-series data representing measurements of a respective flight parameter captured by a sensor at various time-steps during the flight.

At operation 304, a neural network is trained to predict a future measurement of the flight parameter. In some embodiments, training the neural network includes comparing a predictive value from the neural network to a measured value of a flight parameter and modifying structural components of the neural network to bring the predictive value closer to the measured value. In some embodiments, the training may be performed using a differential evolutionary algorithm.

At operation 306, new-series data for the flight parameter is acquired. In some embodiments, the new time-series data is acquired via a parameter acquisition circuit set.

At operation 308, the newly acquired tune-series data is applied to the trained neural network. In some embodiments, the newly acquired time-series data is applied to the trained neural network via a prediction circuit set.

At operation 310, the next measurement for the flight parameter in the newly acquired time-series data is predicted using the trained neural network.

Figure 4:
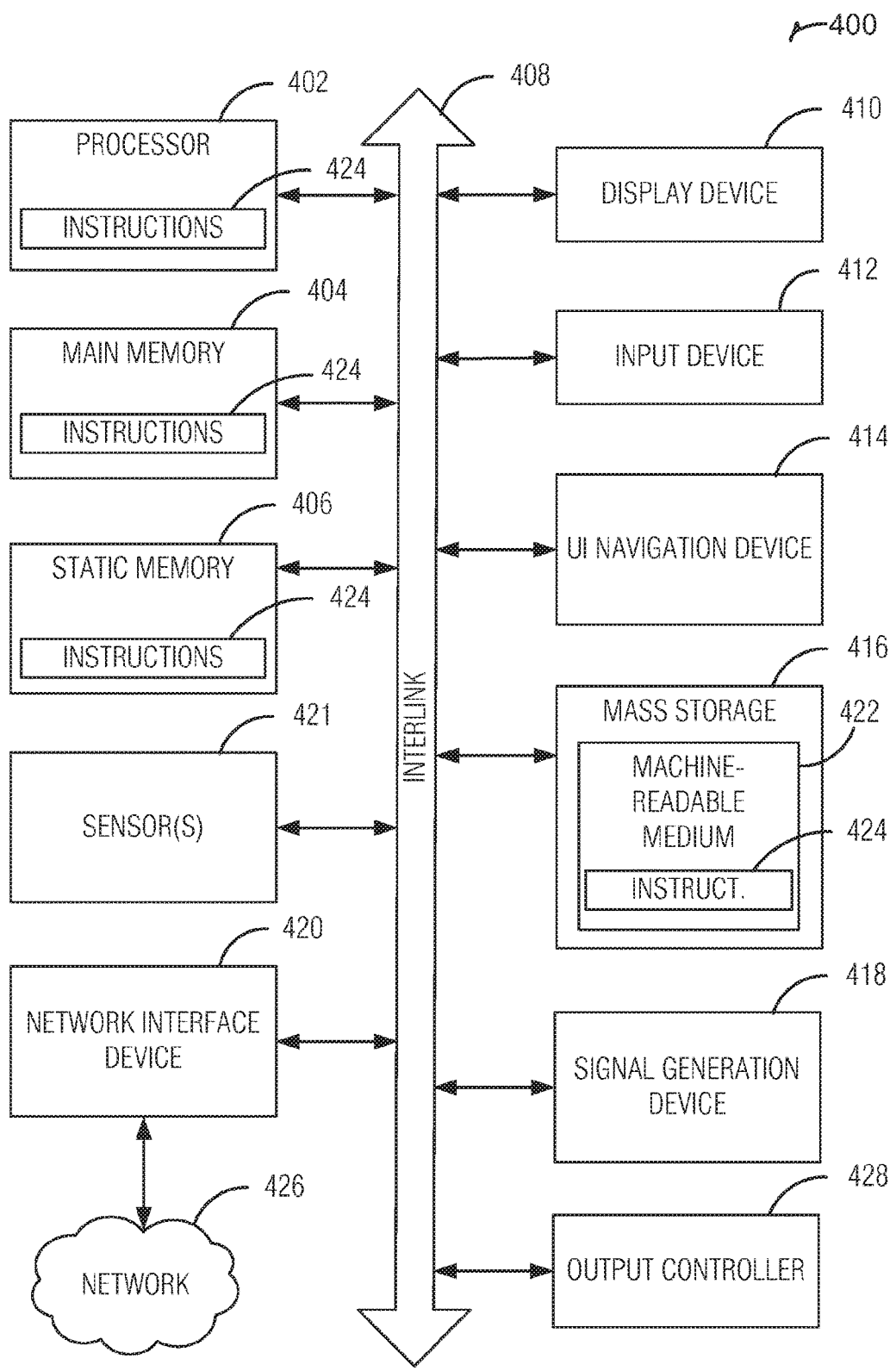
FIG. 4 is a block diagram illustrating an example of a machine, upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shaft also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 416 may include a machine-readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine-readable media.

Although the machine-readable medium 422 is illustrated as a single medium, the term "machinereadable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internes protocol (W), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Experiential Results

The following results were gathered using a Beowulf HPC cluster with 32 dual quad-core computing nodes (256 processing cores total). Each computing node had 64 GBs of 1600 MHz RAM, two mirrored RAID 146 GB 15K RPM SAS drives, two quad-core E5-2643 Intel processors that operated at 3.3 GHz, and used Red Flat Enterprise Linux (RHEL) 6.2 as the operating system. All 32 nodes within the cluster were linked by a private 56 gigabit (Gb) InfiniBand (IB) FDR 1-to-1 network. The code was compiled and run using MVAPICH2-x to allow highly optimized use of this network infrastructure.

Each run of a differential evolution/neural network combination was submitted as a single job, allocating 32 processes across 4 nodes, with 1 master process to handle generating new individuals and updating tare population, and 31 processes to handle the objective function calculations. The asynchronous differential evolution implementation was used to perform this optimization.

The results for optimizing all combinations of the neural networks and input parameters to differential evolution required 12000 jobs equaling approximately 4,800 hours of single CPU computing time. These jobs had a minimum runtime of 2.3 seconds, a maximum runtime of 278 seconds, and an average runtime of 45.1 seconds. As such, utilizing parallel differential evolution on a HPC system enabled running these jobs in a reasonable amount of time, taking approximately a week given shared resources with other users of the cluster.

A random noise estimator (RNE), which uses the previous value as the prediction for the next value, prediction($t_{i+1}$)=$t_i$, was chosen as a baseline comparison, as it represents the best predictive power that can be achieved for random time series data. If the neural networks did not improve on this, then the results would have been meaningless and potentially indicate that the data is too noisy (given weather and other conditions) for prediction. Additionally, it provides a good baseline in that it is easy for neural networks to represent the RNE: all weights can be set to 0, except for a single path from the path from the corresponding input node to the output node having weights of 1. Because of this, it also provides a good test of the correctness of the global optimization techniques, at the very least they should be able to train a network as effective as a RNE; however local optimization techniques (such as backpropagation) may not reach this if the search area is non-convex and the initial starting point does not lead to a good minimum.

Backpropagation was evaluated using both stochastic gradient descent (GD) and conjugate gradient descent (CGD) on flight 13588. Stochastic GD and CGD were run 20 different times for the networks previously described. In all cases, stochastic GD and CGD performed worse than RNE, demonstrating the challenging and non-convex nature of this search area. Accuracy further decreased and became more variable as neural networks became more complicated. Stochastic GD and CGD performed similarly for altitude, pitch, and roll.

Backpropagation was also evaluated using GD and CGD starting from a neural network that simulates a RNE, to address the case of all the initial starting positions of stochastic GD and CGD being poor. However, even the neural networks representing RNE for each network type were close to local minima. Using backpropagation starting from a RNE, airspeed was only improved by 0.018% at best, altitude improved by 0.5%, pitch improved by 0.025%, and roll improved by 0.022%.

Given previous experience training these neural networks, and in order to perform the analysis of more types of neural networks, the differential evolution options were limited to de/best/3/bin and de/rand/3/bin (differential evolution with best or random parent selection, 3 pairs, and binary recombination), with a population size of 500, as these settings had been shown to provide good convergence rates and effective solutions in the past.

Five flights (13588, 15438, 17269, 175755, and 24335) were used for analysis, and neural networks were trained to predict each of the four flight data parameters (airspeed, altitude, pitch and roll) used as input. Each differential evolution strategy and neural network combination was run 20 times, for a total of 12000 runs (2 DE strategies×15 neural networks×4 output parameters×5 flights×20 runs each). The parallel differential evolution was terminated after 15,000,000 total objective functions had been evaluated, or the best fitness in the population had not improved after 1,000 generations.

Table 1 shows rankings for the different neural networks in terms of how well they predicted the given output. The neural networks are ordered according to rank in terms of prediction; e.g., a 1 means the neural network gave the best fitness for one of the flights, a 2 means it gave the second best fitness, etc. Ties (in some cases multiple networks had the same best fitness) were given the same rank, so in some cases there are more than 5 of each rank. The rank column provides the average rank for the neural network across all flights, and the avg. evals. column gives the average number of evaluations it took for the differential evolution to terminate.

In order to gauge the predictive power of the trained neural networks, the best neural networks found for each flight and output parameter were cross-validated against the other flights. In Table 2, each row shows the best neural network found for each flight. The first row shows the random noise estimation (RNE) for baseline comparison. Each column in that row shows the mean absolute error (MAE) for the neural network trained for the specified flight against all the other flights. The bold values show the MAE where the input flight was the flight compared against, while italicized values show where the neural network performed worse than the RNE.

TABLE 1

Neural Network Rankings

| Network | Rank | Ranks | Avg. Evals | Network | Rank | Ranks | Avg. Evals |
|---|---|---|---|---|---|---|---|
| *Airspeed* | | | | *Pitch* | | | |
| elman/i0/h1 | 19.9 | 10, 16, 17, 17, 19, 20, 23, 25, 26, 26 | 2667750 | elman/i0/h1 | 13.0 | 6, 10, 10, 12, 12, 12, 16, 20, 20 | 3543250 |
| elman/i1/h1 | 14.0 | 4, 10, 11, 12, 13, 16, 18, 18, 19, 19 | 3334000 | elman/i1/h1 | 11.6 | 1, 10, 10, 11, 11, 11, 13, 14, 16, 19 | 4104750 |
| elman/i2/h1 | 6.7 | 1, 3, 3, 4, 5, 6, 7, 9, 14, 15 | 4225500 | elman/i2/h1 | 6.2 | 1, 1, 2, 2, 3, 7, 8, 9, 11, 18 | 4793500 |
| ff/i0/h0 | 22.6 | 21, 21, 22, 22, 23, 23, 23, 23, 24, 24 | 830000 | ff/i0/h0 | 23.8 | 23, 23, 23, 23, 24, 24, 24, 24, 25, 25 | 905000 |
| ff/i0/h1 | 24.1 | 22, 23, 23, 24, 24, 24, 25, 25, 25, 26 | 1050000 | ff/i0/h1 | 25.3 | 24, 24, 25, 25, 25, 25, 26, 26, 26, 27 | 1105000 |
| ff/i1/h0 | 13.0 | 11, 11, 12, 12, 13, 13, 14, 14, 15, 15 | 1515000 | ff/i1/h0 | 16.4 | 15, 15, 15, 15, 17, 17, 17, 17, 18, 18 | 1200000 |
| ff/i1/h1 | 14.5 | 12, 13, 13, 14, 14, 15, 15, 16, 16, 17 | 1720000 | ff/i1/h1 | 17.9 | 16, 16, 17, 17, 18, 18, 19, 19, 19, 20 | 1675000 |
| ff/i2/h0 | 6.6 | 5, 5, 5, 6, 6, 6, 8, 8, 8, 9 | 2615000 | ff/i2/h0 | 5.2 | 3, 3, 5, 5, 6, 6, 6, 6, 6, 6 | 2595000 |
| ff/i2/h1 | 8.3 | 6, 7, 7, 7, 8, 8, 9, 10, 10, 11 | 2225000 | ff/i2/h1 | 5.4 | 1, 2, 4, 5, 5, 7, 7, 7, 8, 8 | 2045000 |
| jordan/i0/h0 | 19.8 | 19, 19, 19, 19, 20, 20, 20, 20, 21, 21 | 1573750 | jordan/i0/h0 | 20.7 | 20, 20, 20, 20, 21, 21, 21, 21, 21, 22 | 1372500 |
| jordan/i0/h1 | 21.9 | 20, 20, 21, 21, 21, 22, 22, 22, 24, 26 | 2551750 | jordan/i0/h1 | 22.3 | 21, 21, 22, 22, 22, 22, 23, 23, 23, 24 | 2449750 |
| jordan/i1/h0 | 5.0 | 2, 2, 3, 3, 3, 3, 5, 6, 11, 12 | 6897750 | jordan/i1/h0 | 12.5 | 9, 10, 12, 12, 13, 13, 13, 14, 14, 15 | 4874750 |
| jordan/i1/h1 | 15.5 | 9, 13, 14, 15, 16, 17, 17, 18, 18, 18 | 3712000 | jordan/i1/h1 | 15.4 | 13, 13, 14, 14, 15, 15, 16, 17, 18, 19 | 3640000 |
| jordan/i2/h0 | 1.6 | 1, 1, 1, 1, 1, 2, 2, 2, 2, 3 | 11695500 | jordan/i2/h0 | 3.1 | 1, 2, 2, 3, 3, 3, 4, 4, 4, 5 | 9692500 |
| jordan/i2/h1 | 7.4 | 4, 4, 4, 5, 7, 8, 9, 10, 11, 12 | 5078750 | jordan/i2/h1 | 7.6 | 4, 5, 6, 7, 8, 8, 9, 9, 9, 11 | 5269750 |
| *Altitude* | | | | *Roll* | | | |
| elman/i0/h1 | 22.4 | 20, 21, 21, 22, 22, 23, 23, 24, 26 | 2629000 | elman/i0/h1 | 18.3 | 4, 16, 17, 17, 18, 19, 21, 23, 24, 24 | 3096000 |
| elman/i1/h1 | 16.6 | 11, 13, 13, 16, 17, 17, 17, 24, 25 | 3704000 | elman/i1/h1 | 13.7 | 1, 2, 14, 15, 16, 16, 17, 18, 18, 20 | 3882500 |
| elman/i2/h1 | 16.2 | 12, 12, 13, 13, 15, 16, 18, 19, 19, 25 | 4583750 | elman/i2/h1 | 5.0 | 1, 1, 1, 1, 2, 2, 3, 9, 14, 16 | 4707750 |
| ff/i0/h0 | 20.4 | 18, 18, 19, 19, 20, 20, 21, 21, 24, 24 | 780000 | ff/i0/h0 | 23.8 | 22, 22, 23, 23, 24, 24, 25, 25, 25, 25 | 710000 |
| ff/i0/h1 | 21.7 | 19, 19, 20, 20, 21, 22, 22, 23, 25, 26 | 1205000 | ff/i0/h1 | 25.3 | 23, 24, 24, 25, 25, 26, 26, 26, 27, 27 | 1090000 |
| ff/i1/h0 | 8.6 | 7, 7, 8, 8, 8, 8, 10, 10, 10, 10 | 1635000 | ff/i1/h0 | 11.6 | 8, 8, 11, 11, 11, 11, 11, 13, 13, 15 | 1435000 |
| ff/i1/h1 | 10.0 | 8, 9, 9, 9, 9, 10, 11, 11, 12, 12 | 1705000 | ff/i1/h1 | 13.1 | 9, 10, 12, 12, 13, 13, 14, 15, 16, 17 | 1655000 |
| ff/i2/h0 | 3.2 | 2, 2, 3, 3, 3, 3, 4, 4, 4, 4 | 2060000 | ff/i2/h0 | 5.4 | 4, 4, 4, 4, 5, 6, 6, 6, 7, 8 | 2355000 |
| ff/i2/h1 | 4.2 | 3, 3, 4, 4, 4, 4, 4, 5, 5, 6 | 2335000 | ff/i2/h1 | 7.2 | 5, 5, 6, 6, 7, 7, 8, 9, 9, 10 | 2375000 |
| jordan/i0/h0 | 17.1 | 15, 16, 16, 16, 16, 16, 17, 18, 20, 21 | 1153500 | jordan/i0/h0 | 19.7 | 18, 18, 19, 19, 20, 20, 20, 21, 21, 21 | 1522500 |
| jordan/i0/h1 | 15.9 | 14, 14, 14, 15, 15, 15, 17, 18, 18, 19 | 2425500 | jordan/i0/h1 | 21.5 | 19, 20, 21, 21, 22, 22, 22, 22, 23, 23 | 2387500 |
| jordan/i1/h0 | 6.6 | 6, 6, 6, 6, 6, 6, 7, 7, 8, 8 | 4860500 | jordan/i1/h0 | 10.0 | 7, 7, 9, 10, 10, 10, 10, 10, 13, 14 | 3954750 |
| jordan/i1/h1 | 10.7 | 7, 9, 9, 10, 10, 11, 11, 12, 14, 14 | 4421750 | jordan/i1/h1 | 14.5 | 11, 11, 12, 13, 14, 15, 15, 17, 18, 19 | 3740750 |
| jordan/i2/h0 | 1.3 | 1, 1, 1, 1, 1, 1, 1, 2, 2, 2 | 11706250 | jordan/i2/h0 | 3.3 | 2, 2, 2, 3, 3, 3, 3, 4, 5, 6 | 6838000 |
| jordan/i2/h1 | 5.1 | 2, 3, 3, 5, 5, 5, 6, 7, 7, 8 | 6343750 | jordan/i2/h1 | 7.7 | 3, 4, 5, 7, 7, 8, 8, 11, 12, 12 | 5292750 |

These results show that there is no clear-cut best neural network for prediction of all these flight parameters. However, the Jordan and Elman networks tended to out perform the feed forward neural networks; and in most cases, adding input lags improved the predictive ability of the network. Except in the case of the Elman networks, adding a hidden layer does not seem to provide much benefit (perhaps due to the increased difficulty of optimization). Generally speaking, it seems that Jordan networks (with 2 input lags and no hidden layer) performed the best for predicting altitude and airspeed, while Elman networks (with 2 input lags and 1 hidden layer) performed the best for pitch and roll. Also worth noting is that when the Jordan networks perform the best, they take significantly longer to converge to a solution. Given this, it may be that the Elman networks either converged prematurely or mired. This question does beg further examination, as the more complicated neural networks should theoretically be able to provide more predictive power.

These results show that the trained neural networks have predictive parameters of other flights. They also show a dramatic difference in predictive ability for the different output parameters. Excluding the neural networks trained on flight 17269, predicted airspeed showed a 10-12% improvement over RNE, altitude showed near 70% improvement, while pitch and roll were much lower at 5-7% and 0.5-3%, respectively. Most of the trained neural networks were able to improve over RNE for all the other flights, on which they were not trained. Further, the predictions are accurate. As the input and output parameters were normalized between 0 and 1, the mean average error is also the average percentage error for the prediction. Airspeed predictions were around 0.6% error, altitude predictions were around 0.08% error, pitch was around 1.5% error, and roll was around 2% error.

These results lead to some interesting findings: first, the four parameters used (altitude, airspeed, pitch and roll) are probably not sufficient for prediction of pitch and roll, however they do provide good inputs for predicting airspeed and especially altitude. Using additional input parameters should allow better prediction for these values. Second, using this cross validation it appears that flight 17269 is an outlier, especially in pitch, as it was 50% worse than RNE in predicting pitch from the other flights. These findings present the possibility that it may be possible to determine atypical flights utilizing trained neural networks and potentially identify problematic parameters.

on by using hyperparameter optimization or other metaheuristics. Further, training the neural networks over groups of flights could potentially improve their overall predictive ability as weft as minimize overtraining.

The National General Aviation Flight Database (NGA-FID) provides a data source for researching evolutionary algorithms, machine learning, and data mining. Further analysis of these flights along with more advanced predic-

TABLE 2

Cross Validation for All Flight Parameters and Flights

| Method | 13588 | 15438 | 17269 | 175755 | 24335 | Improvement |
|---|---|---|---|---|---|---|
| Airspeed | | | | | | |
| $t_{i+1} = t_i$ | 0.00512158 | 0.00316859 | 0.00675531 | 0.00508229 | 0.00575537 | 0.0 |
| 13588 elman/i2/h1 | 0.00472131 | 0.00250284 | 0.00656991 | 0.00465581 | 0.00495454 | 10.78% |
| 15438 jordan/i2/h0 | 0.00500836 | 0.00218919 | 0.0067222 | 0.00480868 | 0.00498588 | 10.47% |
| 17269 jordan/i2/h0 | *0.00513133* | 0.0027844 | 0.00620534 | 0.00505878 | 0.00552826 | 4.90% |
| 175755 jordan/i2/h0 | 0.0047884 | 0.00240848 | 0.00643301 | 0.00459774 | 0.00498664 | 11.63% |
| 24335 jordan/i2/h0 | 0.00487011 | 0.00226412 | 0.00666179 | 0.00471104 | 0.00485888 | 11.54% |
| Altitude | | | | | | |
| $t_{i+1} = t_i$ | 0.00138854 | 0.00107117 | 0.00200011 | 0.00137109 | 0.00192345 | 0.0 |
| 13588 jordan/i2/h0 | 0.000367535 | 0.000305193 | 0.000895711 | 0.000399587 | 0.000485329 | 69.18% |
| 15438 jordan/i2/h0 | 0.000394097 | 0.000263834 | 0.000837357 | 0.0004203 | 0.00048358 | 69.87% |
| 17269 jordan/i2/h0 | 0.000702832 | 0.000765161 | 0.000801323 | 0.000694245 | 0.000846411 | 48.65% |
| 175755 jordan/i2/h0 | 0.00037486 | 0.0003003 | 0.00088387 | 0.000390743 | 0.00048446 | 69.42% |
| 24335 jordan/i2/h0 | 0.000380966 | 0.000281196 | 0.000906039 | 0.000404582 | 0.000468267 | 69.43% |
| Pitch | | | | | | |
| $t_{i+1} = t_i$ | 0.0153181 | 0.010955 | 0.0148046 | 0.161251 | 0.0173269 | 0.0 |
| 13588 elman/i1/h1 | 0.014918 | 0.0100763 | 0.0147712 | 0.01514 | 0.0160249 | 4.90% |
| 15438 elman/i2/h0 | *0.0163609* | 0.00881572 | *0.0159061* | 0.150275 | 0.15552 | 4.47% |
| 17269 elman/i2/h1 | *0.0199653* | *0.0249148* | 0.0142671 | *0.0199625* | *0.0291537* | −49.24% |
| 175755 ff/i2/h1 | *0.0153644* | 0.00917981 | *0.0148751* | 0.0145228 | 0.0153566 | 7.35% |
| 24335 elman/i2/h1 | *0.0157302* | 0.00911826 | *0.0160291* | 0.014868 | 0.0149484 | 5.47% |
| Roll | | | | | | |
| $t_{i+1} = t_i$ | 0.0158853 | 0.00604479 | 0.0204441 | 0.012877 | 0.0192648 | 0.0 |
| 13588 elman/i2/h1 | 0.0154541 | 0.00587058 | *0.0206536* | 0.0127999 | 0.0182611 | 2.08% |
| 15438 elman/i2/h1 | *0.0164341* | 0.00544584 | *0.0217141* | *0.0129252* | 0.0176981 | 1.60% |
| 17269 elman/i1/h1 | 0.0157483 | *0.00613587* | 0.0201234 | *0.0129124* | 0.0184769 | 0.95% |
| 175755 elman/i2/h1 | 0.0156503 | 0.00573676 | *0.0205158* | 0.0125207 | 0.017983 | 3.13% |
| 24335 elman/i2/h1 | *0.0163245* | 0.00578885 | *0.0215668* | *0.0131439* | 0.0174324 | 0.68% |

Conclusions from Experiments

The experiments were conducted to analyze flight parameter estimation using various neural networks and input parameters to differential evolution. The neural networks were trained on data recorded during actual student flights, and consisted of noisy, realistic general aviation flight data. Results show that while backpropagation is unable to provide much improvement over a random noise estimator (RNE), parallel differential evolution can provide strong predictions of airspeed (10% better than RNE) and altitude (70% better than RNE). These results were also accurate, ranging between 0.08% accuracy for altitude to 2% accuracy for roll. Cross validation indicated that the trained neural networks have predictive ability, as well as the potential to act as overall descriptors of the flights. The trained neural networks could be used to detect anomalous flights, and even determine which flight parameters are causing the anomaly (e.g., pitch in flight 17269).

How well the neural networks can be trained using particle swarm optimization is of iterest; as well as using autoencoders and other deep learning strategies, or hybrid strategies with genetic algorithms or ant colony optimization to evolve the structure of more complicated neural networks. Performing a grid search over potential evolutionary algorithm parameters is also suboptimal, which can be improved tion methods may help enable more advanced flight, sensors, which could prevent accidents and save lives; this is especially important in the field of general aviation, as it is has the highest accident rates within civil aviation. As many of these flights also contain per-second data of various engine parameters, using similar predictive methods may allow detection of engine and other hardware failures, thus aiding in the maintenance process. This disclosure presents one or more steps towards making general aviation safer through machine learning and evolutionary algorithms.

ADDITIONAL NOTES & EXAMPLE EMBODIMENTS

Example 1 includes subject matter (such as a device, apparatus, or system) for flight parameter modeling, the subject matter comprising: a neural network including a set of input nodes arranged to consume a respective stream of time-series data recorded during a flight of a flying aircraft, each stream of time-series data representing measurements of a respective flight parameter captured by a sensor at various time-steps during the flight; a training circuit set to train the neural network to predict a future measurement of the flight parameter, wherein training the neural network includes comparing a predictive value from the neural network to a measured value of a flight parameter and modifying structural components of the neural network to bring the predictive value closer to the measured value; a parameter acquisition circuit set to acquire new time-series data for the flight parameter; and a prediction circuit set to apply the new time-series data to the trained neural network to predict the next measurement for the flight parameter in the new time-series data.

Example 2 can include, or can optionally be combined with the subject matter of Example 1 to include, wherein the training circuit set uses an evolutionary algorithm to train the neural network circuit set.

Example 3 can include, or can optionally be combined with the subject matter of Example 2 to include, wherein the evolutionary algorithm is a differential evolutionary algorithm.

Example 4 can include, or can optionally be combined with the subject matter of one or any combination of Examples 1 to 3 to include, wherein the flight parameter is one of airspeed, altitude, pitch, or roll.

Example 5 can include, or can optionally be combined with the subject matter of Example 4 to include, wherein the sensor is one of an airspeed sensor to measure airspeed, an altimeter to measure altitude, a pitch sensor to measure pitch, or a roll sensor to measure roll.

Example 6 can include, or can optionally be combined with the subject matter of one or any combination of Examples 1 to 5 to include, wherein the neural network circuit set is one of feed-forward, Jordan, or Elman.

Example 7 can include, or can optionally be combined with the subject matter of one or any combination of Examples 1 to 6 to include, wherein the neural network circuit set has at least one layer of lag nodes.

Example 8 can include, or can optionally be combined the subject matter of Example 7 to include, wherein the at least one layer of lag nodes are additional input nodes to the neural network circuit set, the additional input nodes arranged to consume the stream of time-series data.

Example 9 can include, or can optionally be combined with the subject matter of Example 8 to include, wherein the at least one layer of lag nodes includes a first-order lag layer, the first-order lag layer arranged to calculate a first-order lag for the flight parameter, the first-order lag for the flight parameter being the measurement of the flight parameter at a current time-step of the stream of time-series data minus the measurement of the flight parameter at a time-step immediately preceding the current time-step of the stream of time-series data.

Example 10 can include, or can optionally be combined with the subject matter of Example 9 to include, wherein the at least one layer of lag nodes includes a second-order lag layer, the second-order lag layer arranged to calculate a second-order lag for the flight parameter, the second-order lag for the flight parameter being the measurement of the first-order lag for the flight parameter at the current time-step of the stream of time-series data minus the first-order lag for the flight parameter at the time-step immediately preceding the current time-step of the stream of time-series data.

Example 11 can include, or can optionally be combined with the subject matter of Example 10 to include, wherein the neural network circuit set includes a plurality of weights, and wherein a target weight is calculated for each weight in the plurality of weights.

Example 12 can include, or can optionally be combined with the subject matter of Example 11 to include, wherein the target weight (f(w)) is calculated by the function.

$$f(w) = \frac{\sum_{t=0}^{n-1} |nn(I_t, \Delta_t, \Delta_t^2, w)_{output} - I_{t+1,output}|}{n-1}.$$

Example 13 can include, or can optionally be combined with the subject matter of one or any combination of Examples 1 to 12 to include, wherein the neural network circuit set has at least one hidden layer.

Example 14 can include, or can optionally be combined with the subject matter of one or any combination of Examples 1 to 13 to include, wherein data in a stream of time-series data is normalized.

Example 15 can include, or can optionally be combined with the subject matter of Example 14 to include, wherein the data is normalized to values from 0 to 1.

Example 16 can include, or can optionally be combined with the subject matter of any of Examples 1-15 to include, subject matter (such as a method, means for performing acts, or machine readable medium including instructions that, when performed by a machine cause the machine to performs acts) comprising: consuming, by neural network including a set of input nodes, a respective stream of time-series data recorded during a flight of a flying aircraft, each stream of time-series data representing measurements of a respective flight parameter captured by a sensor at various time-steps during the flight; training the neural network to predict a future measurement of the flight parameter, wherein training the neural network includes comparing a predictive value from the neural network to a measured value of a flight parameter and modifying structural components of the neural network to bring the predictive value closer to the measured value; acquiring time-series data of a flight parameter; and applying the time-series data to the trained neural network to predict the next measurement for the flight parameter in the time-series data.

Example 17 can include, or can optionally be combined with the subject matter of Example 16 to include, wherein the training circuit set uses an evolutionary algorithm to train the neural network circuit set.

Example 18 can include, or can optionally be combined with the subject matter of Example 17 to include, wherein the evolutionary algorithm is a differential evolutionary algorithm.

Example 19 can include, or can optionally be combined with the subject matter of one or any combination of Examples 16 to 18 to include, wherein the flight parameter of airspeed, altitude, pitch, or roll.

Example 20 can include, or can optionally be combined with the subject matter of Example 19 to include, wherein the sensor is one of an airspeed sensor to measure airspeed, an altimeter to measure altitude, a pitch sensor to measure pitch, or a roll sensor to measure roll.

Example 21 can include, or can optionally be combined with the subject matter of one or any combination of Examples 16 to 20 to include, wherein the neural network circuit set is one of feed-forward, Jordan, or Elman.

Example 22 can include, or can optionally be combined with the subject matter of one or any combination of Examples 16 to 21 to include, wherein the neural network circuit set has at least one layer of lag nodes.

Example 23 can include, or can optionally be combined with the subject matter of Example 22 to include, wherein the at least one layer of lag nodes are additional input nodes to the neural network circuit set, the additional input nodes arranged to consume the stream of time-series data.

Example 24 can include, or can optionally be combined with the subject matter of Example 23 to include, wherein the at least one layer of lag nodes includes a first-order lag layer, the first-order lag layer arranged to calculate a first-order lag for the night parameter, the first-order lag for the flight parameter being the measurement of the flight parameter at a current time-step of the stream of time-series data minus the measurement of the flight parameter at a time-step immediately preceding the current time-step of the stream of time-series data.

Example 25 can include, or can optionally be combined with the subject matter of Example 24 to include, wherein the at least one layer of lag nodes includes a second-order lag layer, the second-order lag layer arranged to calculate a second-order lag for the flight parameter, the second-order lag for the flight parameter being the measurement of the first-order lag for the flight parameter at the current time-step of the stream of time-series data minus the first-order lag for the flight parameter at the time-step immediately preceding the current time-step of the stream of time-series data.

Example 26 can include, or can optionally be combined with the subject matter of Example 25 to include, wherein the neural network circuit set includes a plurality of weights, and wherein a target weight is calculated for each weight in the plurality of weights.

Example 27 can include, or can optionally be combined with the subject matter of Example 26 to include, wherein the target weight (f(w)) is calculated by the function.

$$f(w) = \frac{\sum_{t=0}^{n-1} |nn(I_t, \Delta_t, \Delta_t^2, w)_{output} - I_{t+1,output}|}{n-1}.$$

Example 28 can include, or can optionally be combined with the subject matter of one or any combination of Examples 16 to 27 to include, wherein the neural network circuit set has at least one hidden layer.

Example 29 can include, or can optionally be combined with the subject matter of one or any combination of Examples 16 to 28 to include, wherein data in a stream of time-series data is normalized.

Example 30 can include, or can optionally be combined with the subject matter of Example 29 to include, wherein the data is normalized to values from 0 to 1.

Example 31 can include, or can optionally be combined with the subject matter of any of Examples 16-30 to include means to perform any method of the Examples 16-30.

Example 32 can include, or can optionally be combined with the subject matter of any of Examples 1-30 to include a machine-readable storage medium including machine-readable instructions, which, when executed by a machine, cause the machine to implement a method or realize an apparatus as claimed in any of Examples 1-30.

Each of these non-limiting examples can stand on its own, a be combined in various permutations or combinations with one or more of the other examples.

Conventional terms in the fields of neural networks and aviation have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document: for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the, respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

What is claimed is:

1. A system for flight parameter modeling, the system comprising:
    a non-transitory machine-readable medium including a neural network, the neural network including a set of input nodes arranged to consume respective streams of time-series data recorded during a flight of a flying aircraft, each stream of time-series data representing measurements of a respective flight parameter captured by a respective sensor at various time-steps during the flight;
    a training circuit set to train the neural network to predict a future measurement of the flight parameter, wherein training the neural network includes comparing a predictive value from the neural network to a sensor-based measured value of a flight parameter from a respective sensor and modifying structural components of the neural network to bring the predictive value closer to the sensor-based measured value;
    a parameter acquisition circuit set to acquire multiple streams of input time-series data of flight parameters from an aircraft in flight, at least one of the multiple streams correlated to a different flight parameter than the other streams of the multiple streams; and
    a prediction circuit set to apply the multiple input time-series data to the trained neural network to predict the next measurement for one of the flight parameters in the multiple input time-series data.

2. The system of claim 1, wherein the training circuit set uses an evolutionary algorithm to train the neural network.

3. The system of claim 2, wherein the evolutionary algorithm is a differential evolutionary algorithm.

4. The system of claim 1, wherein the one of the flight parameters is one of airspeed, altitude, pitch, or roll.

5. The system of claim 4, wherein the sensor correlated to the one of the flight parameters is one of an airspeed sensor to measure airspeed, an altimeter to measure altitude, a pitch sensor to measure pitch, or a roll sensor to measure roll.

6. The system of claim 1, wherein the neural network is one of feed-forward, Jordan, or Elman.

7. The system of claim 1, wherein the neural network has at least one layer of lag nodes.

8. The system of claim 7, wherein the at least one layer of lag nodes are additional input nodes to the neural network, the additional input nodes arranged to consume the multiple streams of time-series data.

9. The system of claim 1, wherein the neural network has at least one hidden layer.

10. The system of claim 1, wherein data in a stream of time-series data is normalized.

11. The system of claim 10, wherein the data is normalized to values from 0 to 1.

12. A system for flight parameter modeling, the system comprising:
    a non-transitory machine-readable medium including a neural network, the neural network including a set of input nodes arranged to consume a respective stream of time-series data recorded during a flight of a flying aircraft, each stream of time-series data representing measurements of a respective flight parameter captured by a sensor at various time-steps during the flight, wherein the neural network has at least one layer of lag nodes;
    a training circuit set to train the neural network to predict a future measurement of the flight parameter, wherein training the neural network includes comparing a predictive value from the neural network to a measured value of a flight parameter and modifying structural components of the neural network to bring the predictive value closer to the measured value;
    a parameter acquisition circuit set to acquire time-series data of a flight parameter; and
    a prediction circuit set to apply the time-series data to the trained neural network to predict the next measurement for the flight parameter in the time-series data, wherein the at least one layer of lag nodes are additional input nodes to the neural network the additional input nodes arranged to consume the stream of time-series data, wherein the at least one layer of lag nodes includes a first-order lag layer, the first-order lag layer arranged to calculate a first-order lag for the flight parameter, the first-order lag for the flight parameter being the measurement of the flight parameter at a current time-step of the stream of time-series data minus the measurement of the flight parameter at a time-step immediately preceding the current time-step of the stream of time-series data.

13. The system of claim 12, wherein the at least one layer of lag nodes includes a second-order lag layer, the second-order lag layer arranged to calculate a second-order lag for the flight parameter, the second-order lag for the flight parameter being the measurement of the first-order lag for the flight parameter at the current time-step of the stream of time-series data minus the first-order lag for the flight parameter at the time-step immediately preceding the current time-step of the stream of time-series data.

14. The system of claim 13, wherein the neural network includes a plurality of weights, and wherein a target weight is calculated for each weight in the plurality of weights.

15. The system of claim 14, wherein the target weight (f(w)) is calculated by the function $$f(w) = \frac{\sum_{t=0}^{n-1} \left| nn(I_t, \Delta_t, \Delta_t^2, w)_{output} - I_{t+1,output} \right|}{n-1}.$$

16. A method for flight parameter modeling, the method comprising:
- consuming, by a neural network including a set of input nodes, respective streams of time-series data recorded during a flight of a flying aircraft, each stream of time-series data representing measurements of a respective flight parameter captured by a respective sensor at various time-steps during the flight;
- training the neural network to predict a future measurement of the flight parameter, wherein training the neural network includes comparing a predictive value from the neural network to a sensor-based measured value of a flight parameter from a respective sensor and modifying structural components of the neural network to bring the predictive value closer to the sensor-based measured value;
- acquiring multiple streams of input time-series data of flight parameters from an aircraft in flight, at least one of the multiple streams correlated to a different flight parameter than the other streams of the multiple streams; and
- predicting, by applying the multiple input time-series data to the trained neural network, the next measurement for one of the flight parameters in the multiple input time-series data.

17. The method of claim 16, wherein training the neural network uses an evolutionary algorithm.

18. The method of claim 17, wherein the evolutionary algorithm is a differential evolutionary algorithm.

19. The method of claim 16, wherein the one of the flight parameters is one of airspeed, altitude, pitch, or roll.

20. The method of claim 19, wherein the sensor correlated to the one of the flight parameters is one of an airspeed sensor to measure airspeed, an altimeter to measure altitude, a pitch sensor to measure pitch, or a roll sensor to measure roll.

21. The method of claim 16, wherein the neural network is one of feed-forward, Jordan, or Elman.

22. The method of claim 16, wherein the neural network has at least one layer of lag nodes.

23. The method of claim 22, wherein the at least one layer of lag nodes are additional input nodes to the neural network, the additional input nodes arranged to consume the multiple streams of time-series data.

24. The method of claim 16, wherein the neural network has at least one hidden layer.

25. The method of claim 16, wherein data in a stream of time-series data is normalized.

26. The method of claim 25, wherein the data is normalized to values from 0 to 1.

27. A method for flight parameter modeling, the method comprising:
- consuming, by a neural network including a set of input nodes, a respective stream of time-series data recorded during a flight of a flying aircraft, each stream of time-series data representing measurements of a respective flight parameter captured by a sensor at various time-steps during the flight;
- training the neural network to predict a future measurement of the flight parameter, wherein training the neural network includes comparing a predictive value from the neural network to a measured value of a flight parameter and modifying structural components of the neural network to bring the predictive value closer to the measured value;
- acquiring time-series data of a flight parameter; and
- predicting, by applying the time-series data to the trained neural network the next measurement for the flight parameter in the time-series data, wherein the neural network has at least one layer of lag nodes, wherein the at least one layer of lag nodes are additional input nodes to the neural network, the additional input nodes arranged to consume the stream of time-series data, wherein the at least one layer of lag nodes includes a first-order lag layer, the first-order lag layer arranged to calculate a first-order lag for the flight parameter, the first-order lag for the flight parameter being the measurement of the flight parameter at a current time-step of the stream of time-series data minus the measurement of the flight parameter at a time-step immediately preceding the current time-step of the stream of time-series data.

28. The method of claim 27, wherein the at least one layer of lag nodes includes a second-order lag layer, the second-order lag layer arranged to calculate a second-order lag for the flight parameter, the second-order lag for the flight parameter being the measurement of the first-order lag for the flight parameter at the current time-step of the stream of time-series data minus the first-order lag for the flight parameter at the time-step immediately preceding the current time-step of the stream of time-series data.

29. The method of claim 28, wherein the neural network includes a plurality of weights, and wherein a target weight is calculated for each weight in the plurality of weights.

30. The method of claim 29, wherein the target weight (f(w)) is calculated by the function $$f(w) = \frac{\sum_{t=0}^{n-1} |nn(I_t, \Delta_t, \Delta_t^2, w)_{output} - I_{t+1,output}|}{n-1}.$$

31. A non-transitory machine-readable storage medium including machine-readable instructions, which when executed by a machine, cause the machine perform operations, the operations including:
- consuming, by a neural network including a set of input nodes, respective streams of time-series data recorded during a flight of a flying aircraft, each stream of time-series data representing measurements of a respective flight parameter captured by a respective sensor at various time-steps during the flight;
- training the neural network to predict a future measurement of the flight parameter, wherein training the neural network includes comparing a predictive value from the neural network to a sensor-based measured value of a flight parameter from a respective sensor and modifying structural components of the neural network to bring the predictive value closer to the sensor-based measured value;
- acquiring multiple streams of input time-series data of flight parameters from an aircraft in flight, at least one of the multiple streams correlated to a different flight parameter than the other streams of the multiple streams; and
- predicting, by applying the multiple input time-series data to the trained neural network, the next measurement for one of the flight parameters in the multiple input time-series data.

32. The non-transitory machine-readable storage medium of claim 31, wherein training the neural network uses an evolutionary algorithm.

33. The non-transitory machine-readable storage medium of claim 31, wherein the evolutionary algorithm is a differential evolutionary algorithm.

34. The non-transitory machine-readable storage medium of claim 31, wherein the one of the flight parameters is one of airspeed, altitude, pitch, or roll.

35. The non-transitory machine-readable storage medium of claim 34, wherein the sensor correlated to the one of the flight parameters is one of an airspeed sensor to measure airspeed, an altimeter to measure altitude, a pitch sensor to measure pitch, or a roll sensor to measure roll.

36. The non-transitory machine-readable storage medium of claim 31, wherein the neural network is one of feed-forward, Jordan, or Elman.

37. The non-transitory machine-readable storage medium of claim 31, wherein the neural network has at least one layer of lag nodes.

38. The non-transitory machine-readable storage medium of claim 37, wherein the at least one layer of lag nodes are additional input nodes to the neural network, the additional input nodes arranged to consume the stream multiple streams of time-series data.

39. The non-transitory machine-readable storage medium of claim 31, wherein the neural network has at least one hidden layer.

40. The non-transitory machine-readable storage medium of claim 31, wherein data in a stream of time-series data is normalized.

41. The non-transitory machine-readable storage medium of claim 40, wherein the data is normalized to values from 0 to 1.

42. A non-transitory machine-readable storage medium including machine-readable instructions, which when executed by a machine, cause the machine perform operations, the operations including:
consuming, by a neural network including a set of input nodes, a respective stream of time-series data recorded during a flight of a flying aircraft, each stream of time-series data representing measurements of a respective flight parameter captured by a sensor at various time-steps during the flight;
training the neural network to predict a future measurement of the flight parameter, wherein training the neural network includes comparing a predictive value from the neural network to a measured value of a flight parameter and modifying structural components of the neural network to bring the predictive value closer to the measured value;
acquiring time-series data of a flight parameter; and predicting, by applying the time-series data to the trained neural network, the next measurement for the flight parameter in the time-series data, wherein the neural network has at least one layer of lag nodes, wherein the at least one layer of lag nodes are additional input nodes to the neural network, the additional input nodes arranged to consume the stream of time-series data,
wherein the at least one layer of lag nodes includes a first-order lag layer, the first-order lag layer arranged to calculate a first-order lag for the flight parameter, the first-order lag for the flight parameter being the measurement of the flight parameter at a current time-step of the stream of time-series data minus the measurement of the flight parameter at a time-step immediately preceding the current time-step of the stream of time-series data.

43. The non-transitory machine-readable storage medium of claim 42, wherein the at least one layer of lag nodes includes a second-order lag layer, the second-order lag layer arranged to calculate a second-order lag for the flight parameter, the second-order lag for the flight parameter being the measurement of the first-order lag for the flight parameter at the current time-step of the stream of time-series data minus the first-order lag for the flight parameter at the time-step immediately preceding the current time-step of the stream of time-series data.

44. The non-transitory machine-readable storage medium of claim 42, wherein the neural network includes a plurality of weights, and wherein a target, weight is calculated for each weight in the plurality of weights.

45. The non-transitory machine-readable storage medium of claim 44, wherein the target weight (f(w)) is calculated by the function $$f(w) = \frac{\sum_{t=0}^{n-1} \left| nn(I_t, \Delta_t, \Delta_t^2, w)_{output} - I_{t+1,output} \right|}{n-1}.$$

* * * * *